J. F. MONTINE.
CARRIER TRUCK FOR OVERHEAD TRANSPORTATION SYSTEMS.
APPLICATION FILED SEPT. 19, 1919.

1,344,924.

Patented June 29, 1920.
3 SHEETS—SHEET 1.

Inventor
J.F.Montine.

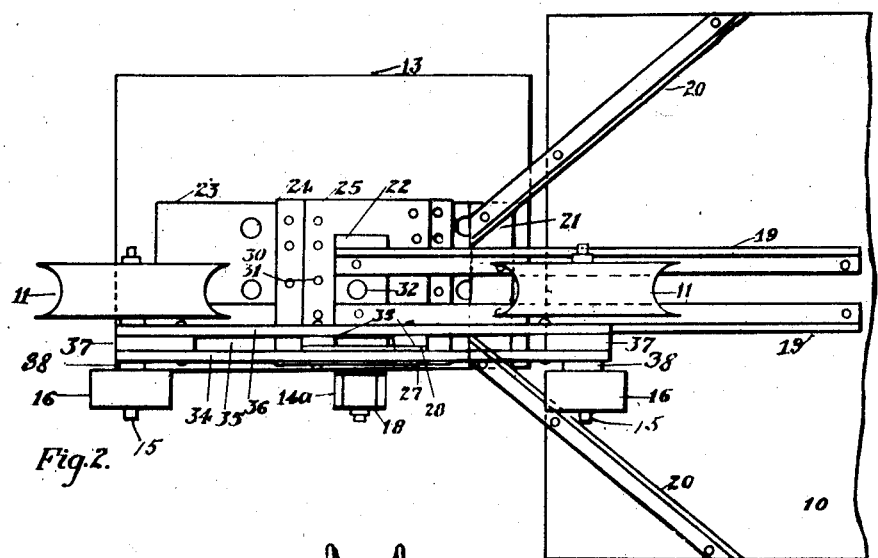
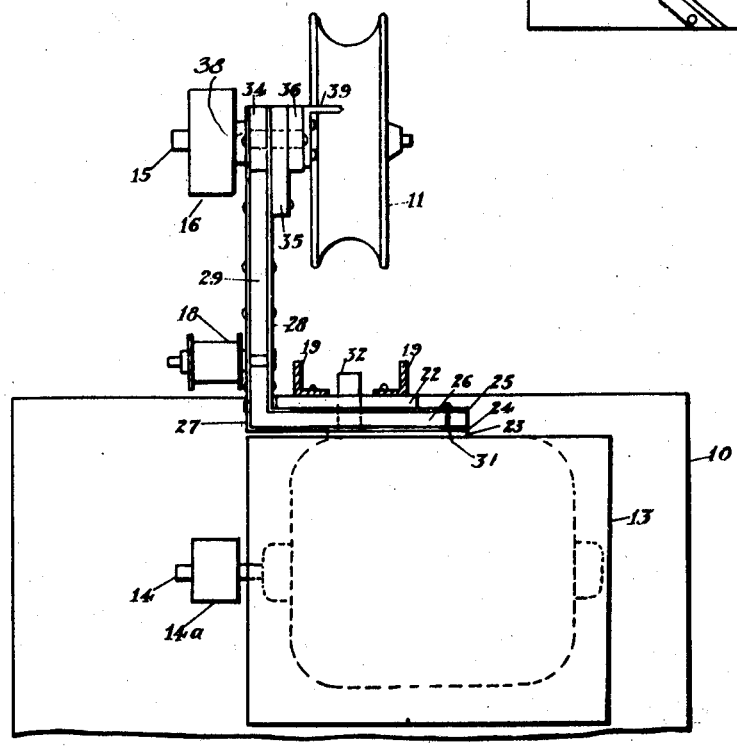

J. F. MONTINE.
CARRIER TRUCK FOR OVERHEAD TRANSPORTATION SYSTEMS.
APPLICATION FILED SEPT. 19, 1919.

1,344,924.

Patented June 29, 1920.

Inventor
J. F. Montine.

UNITED STATES PATENT OFFICE.

JOSEPH F. MONTINE, OF CHICAGO, ILLINOIS.

CARRIER-TRUCK FOR OVERHEAD TRANSPORTATION SYSTEMS.

1,344,924.  Specification of Letters Patent.  Patented June 29, 1920.

Application filed September 19, 1919. Serial No. 324,871.

*To all whom it may concern:*

Be it known that I, JOSEPH F. MONTINE, a citizen of the United States, residing at Chicago, in the county of Cook and State of Illinois, have invented new and useful Improvements in Carrier-Trucks for Overhead Transportation Systems, of which the following is a specification.

This invention relates to apparatus for collecting and delivering mails, merchandise, etc., along a route, the same comprising an elevated track on which is mounted for travel an electric-motor driven truck carrying a receptacle containing the mail matter, etc., the motor obtaining current from an overhead conductor wire by means of a trolley wheel running thereon.

The invention relates more particularly to the truck hereinbefore mentioned, and its object is to provide a novel and improved structure having certain advantages which will be pointed out hereinafter.

In order that the invention may be better understood, reference is had to the accompanying drawings forming a part of this specification.

In the drawings,

Fig. 2 is a plan view of the motor truck;

Fig. 3 is an end view thereof; and

Figure 1:
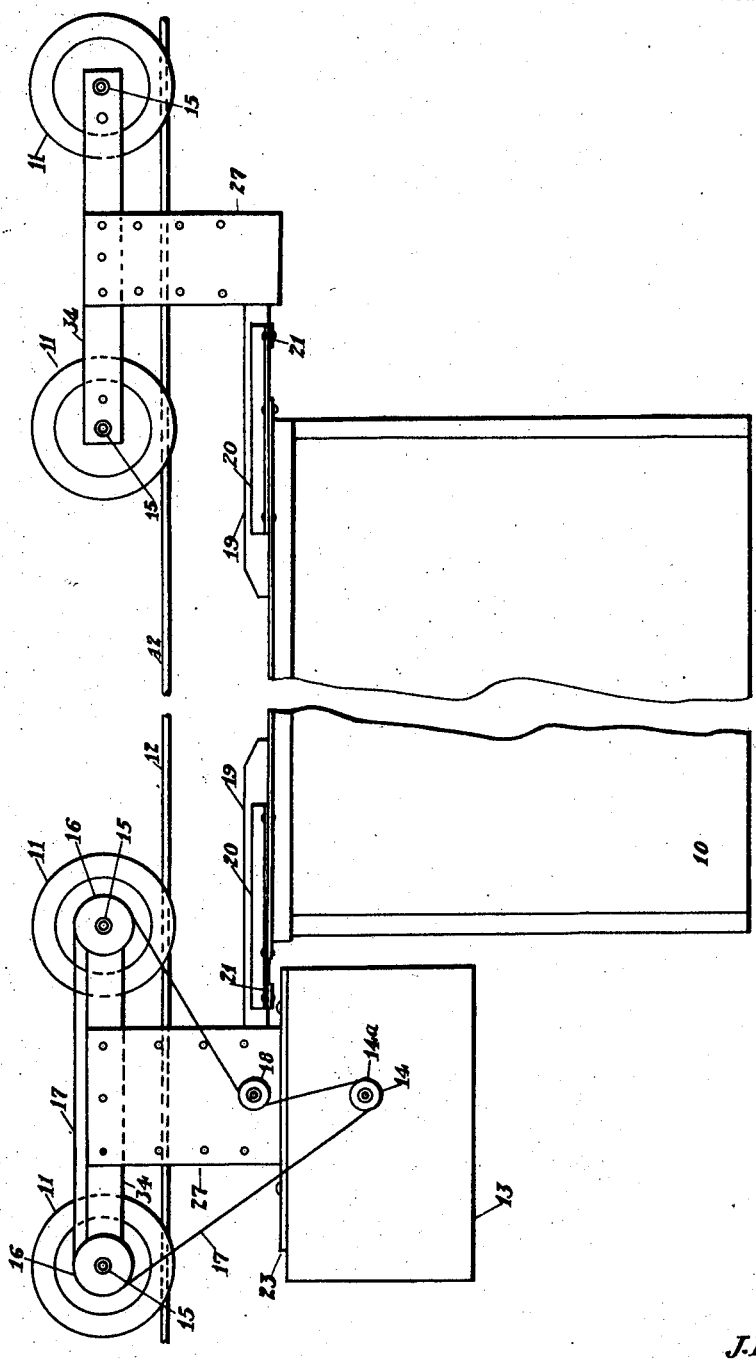
Figure 1 is an elevation of the apparatus.

Referring specifically to the drawings, 10 denotes a car or receptacle in which the mail matter, merchandise or other commodities to be transported are deposited. This receptacle is supported at each end by a truck provided with two grooved wheels 11 which run on an elevated cable track 12, the supports of which latter have not been illustrated. The receptacle hangs between the two trucks. One of the trucks is propelled by an electric motor, and this may be the truck at either end of the receptacle. The construction of the two trucks is the same, with the exception that certain additional elements are provided for the motor truck.

The motor is housed in a casing 13 positioned opposite one end of the receptacle 10, and from the casing projects the shaft 14 of the motor, the projecting end of the shaft being equipped with a pulley 14ª. On shafts 15 of the wheels 11 of the motor truck are pulleys 16. A drive belt 17 passes around these pulleys and also over an idler 18, whereby the motion of the motor shaft is transmitted to the truck wheels, and the apparatus is propelled along the track 12.

The receptacle is suspended from the trucks by a pair of laterally spaced angle irons 19, and two angle irons 20 positioned on opposite sides thereof. These angle irons are rigidly fastened to the top of the receptacle 10 and they project from the end thereof. The angle irons 19 extend in the direction of the length of the receptacle, and the angle irons 20 are positioned obliquely to converge in the direction of their outer ends.

Beyond the end of the receptacle 10, the angle irons 19 and 20 are connected by a cross strip 21, the parts being riveted or bolted together. The angle irons 19 extend beyond the angle irons 20 and their outer ends are connected by a cross strip 22, positioned above the motor housing 13.

On top of the motor housing 13 is riveted, bolted, or otherwise fastened a heavy reinforcing plate 23, and on top of the latter are mounted two plates 24 and 25 the same being vertically spaced by spacer strips 26. At one end of the plate 24, the latter has an upright extension 27, and the corresponding end of the plate 25 has a similar extension 28. The spacer strips 26 have upward extensions 29 at one end seating between the parts 27 and 28 and spacing the same laterally.

The plate 24 is riveted or otherwise fastened to the plate 23, as shown at 30, and the plate 25 is also secured to the plate 23, the fasteners 31 also passing through the spacer strips 26 and the plate 24.

A stud 32 carried by the plate 23 passes through the plates 24 and 25, and also through an aperture in the cross strip 22. This stud serves as a king bolt to permit the motor truck to turn, and allow it free play in following the track 12, independent of the receptacle 10.

The spacer strip extensions 29 seat between the parts 27 and 28, and at the top, the latter support a horizontal bar 34 seating therebetween and extending in the direction of the length of the truck. The bar 34 is riveted, bolted, or otherwise fastened to the parts 27 and 28 and projects forwardly and rearwardly therefrom. The part 28 is reinforced at its ends by short strips 35 placed against its outer face, against which strips is placed and secured a bar 36 extending parallel to the bar 34.

At their ends, the bars 34 and 36 are spaced by strips 37. The parts 34, 36 and 37 have horizontal apertures to seat bearings 38 for the shafts 15 of the wheels 11 and their pulleys 16, and these parts also carry angle bracket members 39 supporting a trolley-pole mount which has not been illustrated as it is the subject matter of another application.

Figure 4:
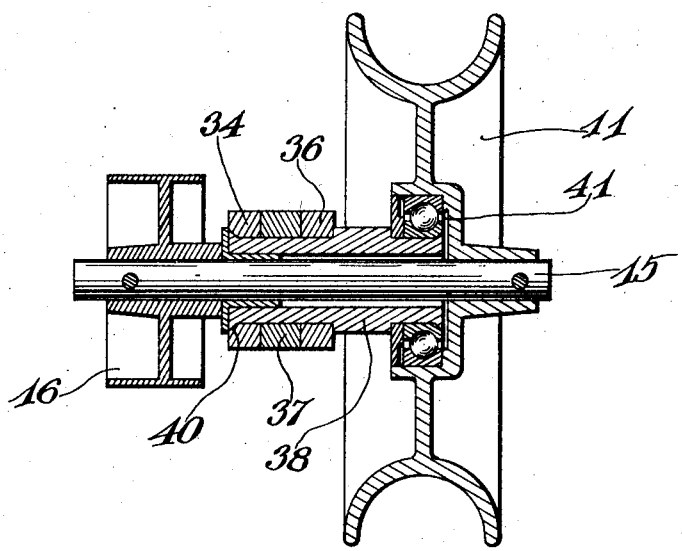
Fig. 4 is a sectional detail of a bearing.

The bearings 38 are particularly constructed to hold the parts 34, 36 and 37 firmly together. As noted in Fig. 4, these parts seat in a reduced portion of the bearing which is originally of a length to project slightly from the outer face of the part 34. The latter is countersunk around the bearing, and the bearing is spread by hammering, as shown at 40 to firmly secure the parts. The same method is used for securing a ball bearing 41 on the opposite end of the bearing 38.

It will be noted that the wheels 11 and the pivot 32 of the motor truck coincide with the longitudinal center line of the receptacle 10, so that a perfect balance is obtained. The motor in the casing 13 can be positioned therein to balance the truck and also counter balance the wheel-supporting frame which is mostly on one side of the wheels.

I claim:

1. A carrier for overhead transportation systems, comprising a receptacle, a motor support, a frame extending from the end of the receptacle onto the latter, said support having an upright frame, and drive wheels carried by said upright frame.

2. A carrier for overhead transportation systems, comprising a receptacle, a motor support, a frame extending from the end of the receptacle onto the motor support for a pivotal connection therewith, said support having an upright frame, and drive wheels carried by said upright frame.

3. A carrier for overhead transportation systems, comprising a receptacle, a motor support, a frame extending from the end of the receptacle onto the latter, said support having an upright frame, and drive wheels carried by said upright frame and coinciding with the longitudinal center line of the receptacle.

4. A motor carriage for overhead transportation systems comprising a motor housing; vertically spaced plates laid on the housing and spaced by separator bars, the plates and bars being rigidly secured to the housing; vertical extensions of the plates and bars at one end to receive a head comprised of parallel horizontal bars; spacing plates between the ends of said last mentioned bars; bearings fitted within said ends and spacing plates; and an axle in each bearing adapted to carry a drive pulley at one end and a traction wheel at the other end.

5. A motor carriage for overhead transportation systems comprising a motor housing; vertically spaced plates laid on the housing and spaced by separator bars, the plates and bars being rigidly secured to the housing; vertical extensions of the plates and bars at one end to receive a head comprised of parallel horizontal bars; spacing plates between the ends of said last mentioned bars; bearings fitted within said ends and spacing plates, the outer ends of said bearings being spread and sunk into the outer faces of the bars with which associated, and an axle in each bearing adapted to carry a drive pulley at one end and a traction wheel at the other end.

In testimony whereof I affix my signature.

JOSEPH F. MONTINE.